United States Patent [19]
Tuffias

[11] 3,918,773
[45] Nov. 11, 1975

[54] MAGNETIC FIELD RESPONSIVE HYDRODYNAMIC BEARING

[75] Inventor: Robert H. Tuffias, Los Angeles, Calif.

[73] Assignee: Litton Systems, Inc., Beverly Hills, Calif.

[22] Filed: Jan. 7, 1974

[21] Appl. No.: 431,436

[52] U.S. Cl. .................................. 308/10; 308/9
[51] Int. Cl.² ................................ F16C 39/00
[58] Field of Search ............ 308/10, 9, 168, 36.3, 1; 209/172.5; 324/151

[56] References Cited
UNITED STATES PATENTS

| | | | |
|---|---|---|---|
| 3,199,932 | 10/1965 | Clark | 308/10 |
| 3,374,037 | 3/1968 | Weinberger | 308/10 |
| 3,436,131 | 4/1969 | Lode | 308/10 |
| 3,455,612 | 7/1969 | Heeb | 308/10 |
| 3,483,969 | 12/1969 | Rosensweig | 209/172.5 |
| 3,488,531 | 1/1970 | Rosensweig | 308/10 |
| 3,629,753 | 12/1971 | Kawabe | 308/10 |
| 3,726,574 | 4/1973 | Tuffias | 308/9 |
| 3,746,407 | 7/1973 | Stiles | 308/36.3 |

OTHER PUBLICATIONS

"Progress in Ferro-Hydrodynamics," by Dr. D. E. Rosensweig; 10/1970, Industrial Research; pp. 36–40.
"Fluid Film Bearings," by P. J. Geary, 1962, British Scientific Instrument Research Association.

Primary Examiner—R. Skudy
Attorney, Agent, or Firm—Thomas A. Turner, Jr.; Alan C. Rose

[57] ABSTRACT

A self-contained, fluid bearing assembly for the support of a load is described. The fluid is a ferro-hydromagnetically responsive fluid disposed between the two members joined by the bearing assembly. The oppositely disposed respective faces of these members are described having a special construction so that upon application of a rotating magnetic field to the fluid, the bearing achieves load sustaining capabilities and self-contained fluidic characteristics.

16 Claims, 8 Drawing Figures

MAGNETIC FIELD RESPONSIVE HYDRODYNAMIC BEARING

BACKGROUND OF THE INVENTION

Non-rotating, load-bearing minimum friction bearings are critical to the operation of many machine systems, such as the output axis bearings for floated gyros and sensitive balances. In the past, jewel and pivot, magnetic, hydrostatic fluid film, and knife edge bearings have been employed to give minimum friction support.

Each type of bearing has its inherent problems such that no one type is universally used. For example, the hydrostatic fluid film-type bearing requires a fluid reservoir with an external pump for circulating fluid constantly to the bearing surfaces.

Load-bearing, minimum friction bearings are critical to the operation of many machine systems such as, for example, sensitive inertial guidance instruments. In the past, ball bearings and roller bearings have been employed to give minimum friction support. Such bearing arrangements necessarily require high speed rotational movement of metal parts in close proximity to, oftentimes in physical contact relationship with other metal parts. Such systems work only for limited periods of time, and only with rather extensive application of fluid lubricants.

To solve the problems of large quantity fluid requirements and short life, minimum friction bearings employing fluid mediums or lubricants, such as, for example, liquids or gases, were developed. The lifetime of such bearings was extended, but the requirement for large quantities of fluid mediums remained. Moreover, such bearings required intricate and complicated fluid pumping means and conduits for constantly replacing the fluid exhausted by the high rotational speeds in such machine systems.

In recent years, bearing assemblies having selfcontained fluid pools have been developed, such as those disclosed in U.S. Pat. Nos. 3,726,574 and 3,746,407, both of which are assigned to the same assignee as the present invention. Such fluidic, low friction self-contained bearings are made possible by the development of magnetically responsive magnetizable fluid given the name ferrofluid by its developer, Dr. Ronald E. Rosensweig. Ferrofluid is described in Rosensweig, "Progress in Ferrohydrodynamics," *Industrial Research*, October, 1970, at 36–40, Vol. 12, No. 10. Ferrofluid as defined therein is a dispersion of colloidal magnetic particles in a liquid carrier. These particles tend to align themselves with applied magnetic fields. It should be noted from the description of ferrofluid that ferrofluid need not necessarily contain iron or ferrous-type metal. It is only necessary, for a fluid to be so called, that the fluid be magnetizable, or capable of being influenced by magnetic fields. The term "magnetic fluid" is sometimes used interchangeably with the term "ferrofluid" and shall be so used throughout in the following specification and claims.

In the ferrofluid, or magnetic fluid applications as described in the above-identified letters patents assigned to the assignee of the present invention, many problems have been found. In particular, during start-up and stopping of high speed, relatively rotatable elements, a metal rotor momentarily has physical contact with the metal of a metal stator. Such metal-to-metal contact results from axial rotor movement as described by Stiles, et al., in U.S. Pat. No. 3,746,407. Moreover, during periods of non-rotation of the rotor, the ferrofluid or magnetic fluid can be urged to the outside of the fluid containing zone or chamber, and may escape. The inertial friction caused by the rotor resting directly against the stator is sufficiently high enough so as to be a matter of concern.

In addition, all of the foregoing disadvantages of the prior art provide for less than optimum or desired longevity, durability, and wear characteristics.

SUMMARY OF THE INVENTION

In accordance with one form of the invention, a new and improved ferrohydrodynamic minimum friction bearing is shown and described in a bearing assembly which includes a first and a second joined structural members in non-contacting relationship. The first and second members are positioned in close proximity without physical contact therebetween, such positioning forming a fluid containing zone or chamber between them. The fluid is a magnetizable fluid having colloidal suspension of magnetic particles which are responsive to super-imposed magnetic flux fields. An array of magnetic flux inducing coils are arranged in the bearing assembly, or in close proximity thereto so that upon selected and predetermined application of variable magnetic fields within the bearing assembly, more fully described in the specification below, the magnetic fluid constitutes the point of load support between the adjoined members within the bearing. This rotating fluid interacts with the geometry of the first and second members causing a pressure to be developed which will support a load.

In accordance with one form of the invention, the magnetic fluid is set into motion by the coils without regard to the relative motion of the elements or members being adjoined by the bearing assembly. The description points out forms of the invention wherein the magnetizable fluid is self-contained within the bearing assembly, and provides a ferrohydrodynamic environment for static members being adjoined in the bearing assembly.

DESCRIPTION OF THE PREFERRED EMBODIMENT

Figure 1:
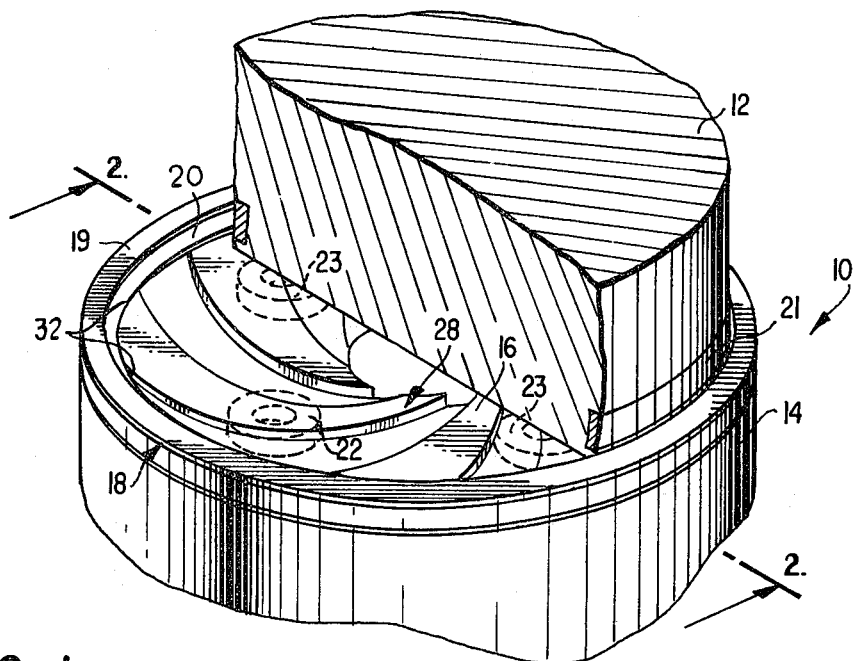
FIG. 1 illustrates a perspective, partially fragmentary view of one embodiment of the invention.

In an effort to overcome the aforementioned problems attendant with bearing assemblies under conventional and known configurations, a bearing assembly 10 joining a first structural member 12 with a second structural member 14 is shown, reference being made to FIG. 1 of the drawings. Member 12 is shown as being cylindrical in structure, sitting within the inside diameter of cylindrical structural member 14. Within the base 16 of member 14, electrical field coils 22, 23 are shown, which will be explained more fully below. The periphery of the cylindrical member 14 is shown being capped by annular permanent magnet assembly 18, which extends radially more toward the center 24 of member 14 than the vertical wall of member 14. Bearing members 12, 14 may be workpieces themselves, or connected to workpieces, not shown.

Figure 2:
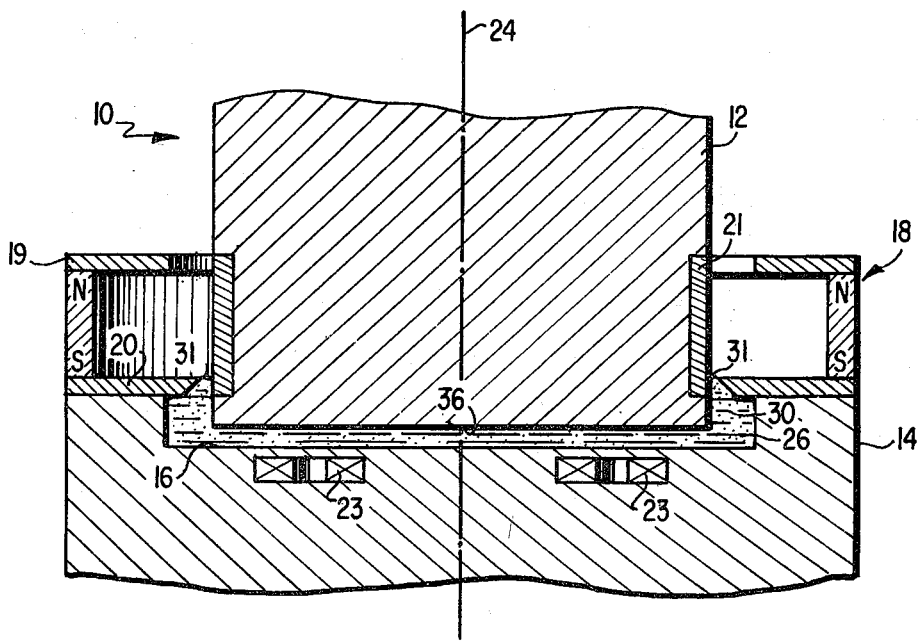
FIG. 2 illustrates a side elevational, cutaway view of the invention, taken from line 2—2 of FIG. 1.

The position of permanent magnet assembly 18, and its pole pieces 19, 20 is seen better in FIG. 2 of the drawings. The permanent magnet assembly 18 so extends in the radial direction toward member 12 that it never touches or makes physical contact with member 12, but does come in relatively close proximity to the vertical, cylindrical wall of structural member 12. If member 12 is not constructed of magnetic material, a cylindrical, magnetizable ring 21 is required to complete the magnetic path.

The lower poles 20 of permanent magnet assembly 18 is in such proximity to cylindrical wall of member 12 that a short gap 31 between these elements, but in the magnetic path, is formed. The lower pole 20 of permanent magnet assembly 18 is formed having an annular line, or sharp point in cross-sectional view, so that a high magnetic field gradient is created between it and member 12. The upper pole piece 19 may be similarly constructed. In such a manner, the magnetomotive force of this magnetic field forcefully holds the magnetic fluid 26 in the gap 31, thereby forming a seal in the gap 31. Thus, the remaining magnetic fluid 26 is effectively held within the chamber 30, even under conditions where the magnetic fluid 26 is being urged to the outside, radial periphery of zone or chamber 30. The permanent magnet assembly 18 could be constructed or established by an electrical field coil if desired. Such a field coil would have the advantages of selective predeterminable operation and reversible fields.

The view of FIG. 2 is taken along a diametrical cut through the perspective view of FIG. 1 wherein the cut intersects the electrical field coils 23.

Electrical field coils 22, 23 are wound in such a way that they give similar magnetic flux field configurations upon excitation. The coils are energized in such a manner as to develop a magnetic field which rotates about the symmetry axis 24 of the bearing assembly device. The field coils 22, 23 may be positioned in the zone 30 itself. It is not necessary, however, that they be within the zone 30 so long as the flux fields of these coils can influence the magnetic fluid 26 in the zone 30. Thus, the coils 22, 23 could be positioned within the base 16, as shown in FIG. 2 of the drawings, as long as the element in which it is placed, such as structural member 14 in the preferred embodiment, does not materially distort the magnetic field. Minor, inconsequential distortions of the magnetic field of course, could be tolerated.

If so desired, the coils 22, 23 could be placed in the annular or peripheral parts of structural member 14 within structural member 12 if it is non-magnetic, or could be placed, alternatively, outside the structural members completely. It is only required that the flux fields of the coils 22, 23 be influential within the zone 30.

Joined structural member 12 rests upon magnetic fluid 26, shown in solid black shading in FIG. 2 of the drawings. Magnetic fluid 26 is shown fully filling zone 30, which is defined as the space between joined structural members 12 and 14 and the radially, inwardly extending permanent magnet assembly 18.

Figure 3:
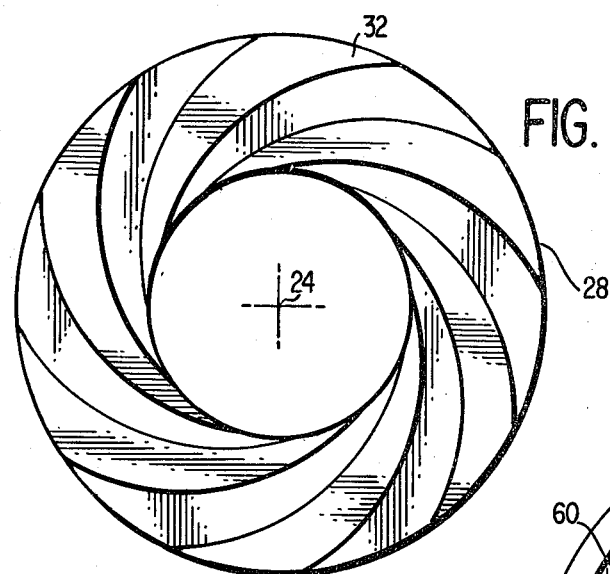
FIG. 3 is a schematic of one section of one form of the invention.

The base 16 of joined member 14 is constructed having grooves 32 formed in a pattern therein, similar to that groove pattern shown in FIG. 3. The grooves 32 should be constructed in a pattern such that fluid passing thereover will be biased or urged either toward the axis 24 of symmetry or center, or toward the outside periphery of the zone 30, depending upon which annular direction the magnetic fluid 26 is moving.

Representatively, a spiral pattern of grooves 32 extending clockwise from the center 24 of the regional surface is shown in FIG. 3. Such a pattern urges the fluid 26 which is moving in the counterclockwise direction, facing face 28, to be urged toward the axis of symmetry or center 24 of the face 28,. Thus, the forces on the magnetic fluid 26 create a sufficient bearing support pressure at this center 24.

Figure 4:
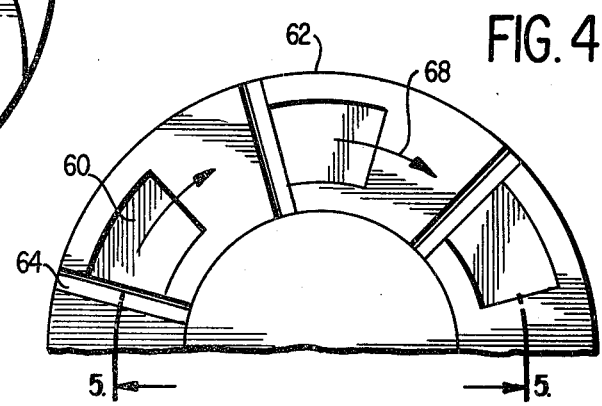
FIG. 4 illustrates an alternative section of one form of the invention.
Figure 5:
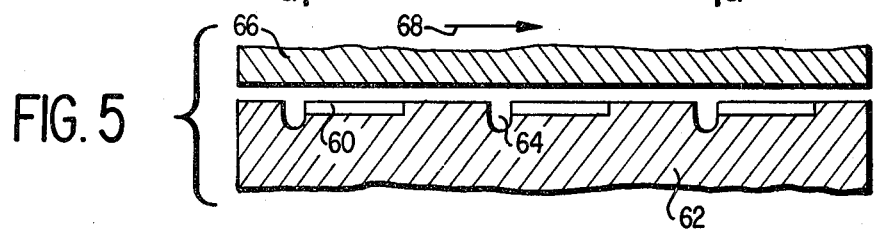
FIG. 5 illustrates a side elevational view of one section of the invention, taken along line 5—5 of FIG. 4.

The spiral pattern is not critical to the operation of the invention. Alternative geometric configurations, such as that shown representatively in FIGS. 4 and 5, as well as others, also satisfactorily will coerce the magnetic fluid toward the point of symmetry such that bearing support pressures will be developed at that point. In FIGS. 4 and 5, a schematic view is shown of troughs 60 formed within face 62. Grooves 64, having a deeper penetration into face 62 than troughs 60, are shown radially extending to the outside circumference of face 62. When fluid is rotated in the direction of arrows 68, fluid pressure is created in the zone between the faces 62 and 66. Other suitable face designs can be used, such as those shown in Scientific Instrument Research Association, BSIRA Res. Rep. R.286, "Fluid Film Bearing," P. J. Gerry, at 45–47 (Section 42). In particular note FIG. 15 in this report.

It may be desirable to have grooves on both oppositely disposed joined face members. In the embodiments of the invention as taught herein, the grooves on one face should be the mirror image on the oppositely disposed face. In other words, if the bottom face 36 of structural member 12 is to be grooved, the grooves should extend radially from the center in a counterclockwise direction, when facing the face 36. Thus, such grooves will be a mirror image of the grooves 32 which extend from the center 24 of base 16 in the clockwise direction, as shown in FIG. 3.

As indicated in FIG. 1, there are four electric field coils spaced equidistant from each other within the base 16 of structural member 14. Two of the coils 22 are disposed diametrically opposite to each other. The remaining two coils 23 are disposed diametrically opposite each other, each equidistant between the first coils 22. By selectively supplying alternating electrical current to the coils 22 and 90°, electrically, out of phase with the supply of alternation current to the coils 23, in the well-known manner of creating a rotating field for magneto motors, a motion can be established in the magnetic fluid 26 within the zone 30. This motion can be sustained, and can reach rather large rates of revolution or rotation. See, for example, Rosensweig, "Progress in Ferrohydrodynamics," *Industrial Research*, October, 1970, at 37–38, Vol. 12, No. 10.

Normally, when fluid is rotated about an axis, the fluid is urged in a direction tangential to the circumference of the circular path of movement. Because a pattern of grooves 32 is formed on the face of base 16 of structural member 14, the tangential inclination of the rotating fluid is altered. The movement of the fluid 26 is thus biased toward the center 24 of fluid rotation.

It can be seen from the foregoing drawings and description that a suitable fluid bearing completely separating the oppositely facing parts of joined bearing members 12 and 14 can be made. The fluid 26 completely bears the weight or other pressures which structural member 12 imparts toward structural member 14, or vice versa, even though structural member 12 bears no motion relative to bearing member 14. Moreover, the bearing assembly device fluid is self-contained. No expensive or intricate pumping arrangement or configuration is needed. The magnetic fluid 26, though in movement at determinable rates, is completely contained within the compact bearing zone 30. What parts of the fluidic medium do approach the gap 31 are restrained from leaving zone 30 by the magnetomotive force influencing the gap 31 from the magnet assembly 18. In such a manner, the outside surfaces and environment of the herein-described bearing remain fluid free and, more or less, spotless.

Of course, the advantages of such an embodiment of the invention are applicable with equal usefulness if bearing structural members 12 and 14 are rotating about an axis of rotation with similar velocity relative to each other, while the magnetic fluid is maintained stationary or rotating in an opposite direction by virtue of the rotating magnetic field. The same degree of usefulness is achieved, further, if a structural member moves with equal velocity and in a parallel direction with the other structural members.

Without the use of the present invention developing the support pressures of the magnetic fluid, the pressures of structural members 12 and 14 against each other would very likely force the magnetic fluid 26 in zone 30 through the gap 31 between the permanent magnet assembly's lower pole piece 20 and structural member 12. The evacuation of zone 30 of the fluid 26 would thereby allow external forces on structural member 12 to force it into an undesirable direct physical contact with structural member 14. For example, if members 12, 14 are made of metal, the contact becomes an undesirable metal-to-metal frictional contact. Very substantially higher frictional forces then resist any efforts to move one of the structural members differentially from the other, so abutting structural member.

With the use of the present invention, however, members joined by the described magnetic fluid bearing are maintained in virtually fricitionless contact, and are susceptible to differential motion relative to each other instantaneously, without any appreciable friction or inertia, upon the slightest of driving forces. Moreover, the wear of the members joined is substantially extended since there is no opportunity for direct, possibly metal-to-metal contact between the joined members.

It is to be noted, further, that the combined effects of the rotating magnetic flux field caused by the alternating of the magnetic flux fields of coils 22 and 23 in a predetermined relationship, and the grooves 32 formed about the expected axis of rotation 24 of the magnetic fluid 26, give a volume of greatest fluidic pressure, or exert the greatest relative pressure against the structural members 12, 14 at the axis of rotation 24. The tendency of the magnetic fluid 26 to escape through the gap 31 between permanent magnet assembly 18 and magnetic member 12 is substantially lessened as a result of the inward pumping or urging action.

While the movement of magnetic fluid 26 freely within zone 30 would have a tendency to urge the adjacent faces either of structural member 12 or of structural member 14 to rotate in the direction of magnetic fluid rotation, such an inclination is rduced completely by a bearing zone or chamber, not shown, complementally disposed in a leading, rotating magnetic field disposed at the opposite axial end of structural member 12 or member 14, and rotating or leading in an annular or circular direction opposite that within zone or chamber 30.

The magnetic fluid, it should be appreciated, is very much a fluid. Thus, since by the foregoing description it is seen that the magnetic fluid completely separates the structural members adjoined in the bearing assembly device, the magnetic fluid acts effectively as a lubricant of each of the bearing structural members adjoined relative to the others. Moreover, it should be noted that the magnetomotive force (mmf) which assists in preventing the magnetic fluid from escaping through gap 31, and the force of the rotating-fluid 26 toward the axis of rotation can both be overcome partially or perhaps substantially by outside, extraordinary forces upon the members adjoined. In such an extraordinary force of short duration, such as a shock, the combined forces of the mmf at gap 31 and the rotating-fluid force will act to absorb such a shock. In such a manner, the present invention offers shock absorbing characteristics not before known or taught.

Such a use of the invention as described above should not be thought to preclude additional embodiments or variations capable of utilizing the present bearing device invention as as herein described. For example, non-cylindrical structural members might be adjoined satisfactorily using the rotating, leading magnetic field principle herein described. It would only be necessary to position field coils operable in the manner aforementioned so as to urge the magnetic fluid in a zone between the structural members such that the magnetic fluid pressure is developed by the geometry therein. The area of fluid pressure accumulation would then become the support area of minimum friction between the joined structural members.

It is contemplated that the bearing assembly device as described above is to be used in an environment where the structural members adjoined are static. That is to say, the structural members 12, 14 remain stationary, or they move in only very small amounts such as on the order of one circular degree or so. In such a stationary joined member circumstance, it is requisite to cause the fluid to move by outside forces as described above. This invention, however, has clear and advantageous use in circumstances where one or more of the adjoined structural members move at a more significant rate relative to the others.

Figure 6:
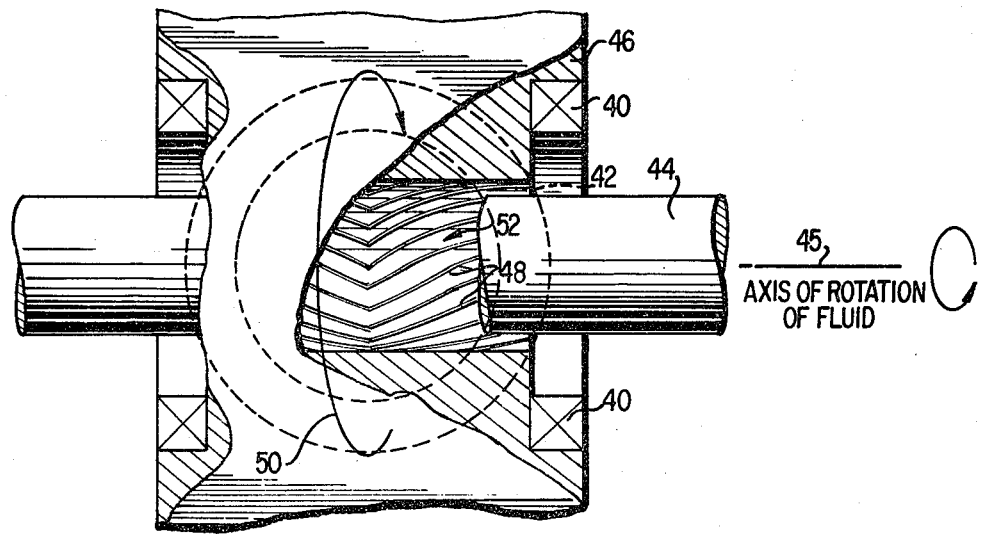
FIG. 6 illustrates a side elevational, partially fragmentary view of a second embodiment of the invention.

In FIG. 6 such another specific embodiment of the invention is shown as it is applied to a ferrohydrodynamic journal bearing device. Electrical field coils 40 and 42 are positioned about the axis of rotationally free structural member 44. In the elevational view of FIG.

6, the cross-sectional plane of horizontally disposed magnets 40 are shown from the vertical plane which includes the axis 45 of rotor 44 rotation. The electrical field coil magnets 40 have a common axis, not designated, which is vertical in the view of FIG. 6. Electrical field coil magnets 42 have a common axis, not shown, perpendicular to the axis 45 of rotor 44 rotation, and perpendicular to the axes of magnets 40. Only one of the magnets 42 is illustrated positioned on the far side of rotor 44 in the partial, fragmentary view of FIG. 6.

As shown in FIG. 6, electromagnets 40 can be selectively energized by alternating-current power sources at 90 degrees, electrically, out of phase with the selective energization of circumferentially disposed electromagnets 42. In such a manner of field coil magnetic field energization, a leading, rotating magnetic field can be generated about the rotationally free member 40.

Stationary structural member 46 can be placed surrounding rotationally free structural member 44. If structural member 46 has an inner cylindrical face oppositely facing the cylindrical wall of member 44, which face is grooved in a pattern which urges the magnetic fluid contained between structural members 44 and 46 toward the center of the chamber between them, the magnetic fluid will create a fluidic bearing pressure about the annular center of the zone or chamber between cylindrical structural members 44 and 46. The herringbone shaped groove pattern, having grooves 48 as shown in FIG. 6, will achieve such an end. Other patterns will also achieve the desired result.

The herringbone shaped grooves shown in FIG. 6 could be arranged on the radially inward face of journal member 46, or upon the outside surface of structural member 44 as shown. Of course, the grooves 48 shown in FIG. 6, placed along the outside cylindrical surface of structural member 44, will urge the magnetic fluid toward the center of the cylindrical journal only if the direction of the leading field magnetic field is established in the direction of arrow 50. If the grooves 48 are arranged on the member 46 in the same, i.e. mirror image pattern as shown for the outside surface of structural member 44, the rotation of structural member 44 in the direction of arrow 50 will urge the magnetic fluid to the outside or ends 52 of the cylindrical bearing device. In such a circumstance, it will be necessary for the driving, leading field force, created by coils 40 and 42 to be strong enough with sufficient differential velocity to overcome the forces on the magnetic fluid caused by the thus arranged groove pattern.

If the direction of rotation of rotating structural member 44 were opposite to the direction of the leading field shown by arrow 50, the magnetic fluid would then be urged to the outside or ends 52 of the cylindrical structural member shown in FIG. 6, if it had grooves 48 arranged in the mirror image of the pattern on the stationary member 46 as shown in FIG. 6. In such a configuration it will, again, be necessary to have a leading magnetic field of sufficient force and differential rotational speed or velocity to overcome the inertial force on the magnetic fluid caused by the rotation of structural member 44.

An alternative hydrodynamic bearing pressure can be developed by coercing or forcing fluid into a closed, wedge shaped region. An eccentric journal, such as is shown representatively in cross-sectional view in FIG. 7 could also, therefore, be used in carrying out even another alternative embodiment of this invention. Such a journal would eliminate the need for grooves or groove patterns. Rotational flow of the magnetic liquid 26 could be established in the direction of arrows 98 by conventional rotating leading field coils, as described above. The magnetic fluid at the narrower, constricted portion of the fluid chamber 96 would thus become pressurized without the necessity of channeling grooves. Such a pressure could be made sufficient to support member 12 on the magnetic liquid 26 in bearing relationship to member 14, reference being had to FIG. 7 of the drawings.

Figure 8:
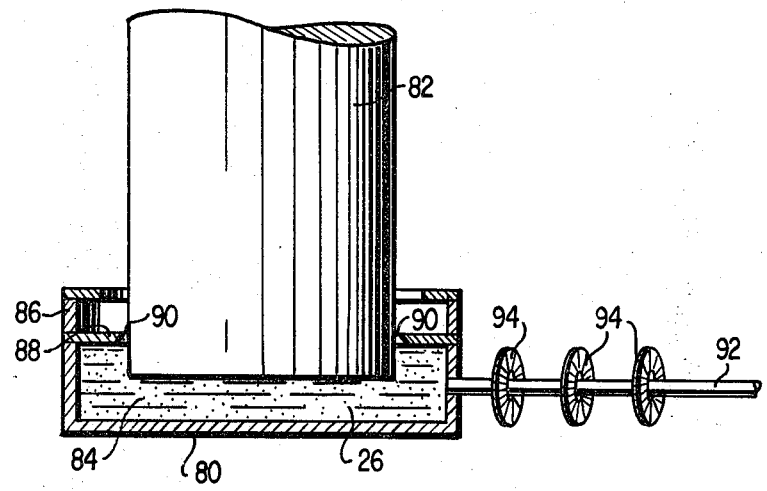
FIG. 8 illustrates a side elevational, cutaway view of an alternative embodiment of the invention.

Additional embodiments of this invention abound, but are not specifically detailed. One such embodiment could be a bearing assembly as depicted in FIG. 8 of the drawings. As therein shown, two structural members 80, 82 are shown positioned in close proximity to each other. A chamber or zone 84 is shown defined between them. Further defining the zone 84 is permanent magnet assembly 86 having a pole piece 88 extending from one structural member 80 to the other structural member 82, but not in actual contact, thereby leaving a gap 90. Such construction is similar to the bearing assembly device described above for comparable components.

In FIG. 8, however, a conduit 92 is shown leading from the zone 84. Magnetic fluid 26 is supplied from a source, not shown, to conduit 92. Magnetic field exciting field coils 94 are constructed about conduit 92 so that upon excitation, the field coils 94 create within the conduit 92 magnetic fields. If the coils 94 are so excited in progressive order leading to the zone 84, magnetic fluids 26 within the conduit 92 will be influenced, or urged toward the chamber or zone 84. It can be seen that magnetic fluid 26 within the zone 84 will experience a pressure increase as a result of the selective coil 94 excitation.

Should the coils 94 be progressively excited in the opposite direction, leading away from zone 84, the magnetic fluid 26 will be urged away from the zone 84. Consequently, the pressure of the magnetic fluid 26 within the zone 84 will decrease.

Figure 7:
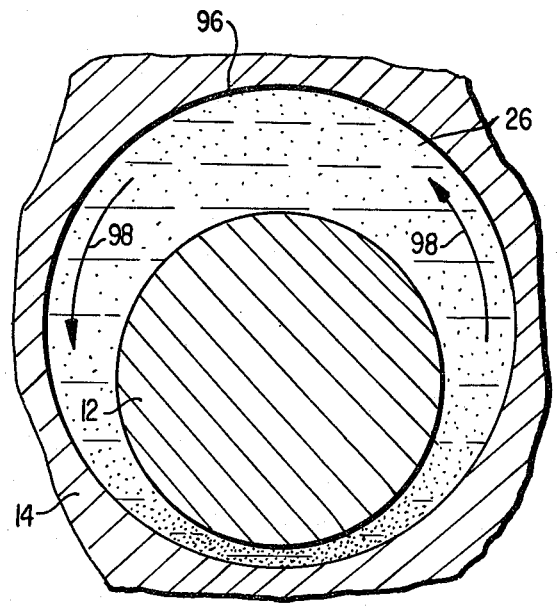
FIG. 7 illustrates a cross-sectional elevational view of yet another embodiment of the invention.

Such a concept as is shown in FIG. 7 could be modified by having a plurality of such conduits 92 directed to, and in hydraulic connection with the zone or chamber 84. The magnetic fluid 26 could then be urged either into or out of zone 84 with greater force and from various sides of, or angles to the bearing assembly device chamber or zone 84. Greater increases and decreases of pressure of the magnetic fluid 26 at greater speeds would then be possible.

The angle of incidence of the magnetic fluid 26 being urged into the chamber or zone 84 can be controlled in the embodiment of FIG. 8 merely by constructing the connection between the conduit 92 and the zone 84 according to the desired angle. In such a manner, control of the magnetic fluid 26 being pressurized in the zone 84 is established. Such control may be sufficient to achieve the desired concentration of pressure within the chamber or zone 84 so that grooves or pattern on the adjacent bearing structural surfaces need not be constructed.

Substantially other and different embodiments may also be found utilizing the principles of the present invention, as can be seen by the varied embodiments of the present invention shown and described in the foregoing specification. The scope, therefore, of the pres-

I claim:

1. A bearing assembly comprising:
   a. at least a first and a second members disposed in proximity to each other, each said member having a bearing surface oppositely disposed to the other, said bearing surfaces forming a chamber therebetween;
   b. magnetic fluid present within said chamber; and
   c. means for generating a rotating magnetic field within said magnetic fluid, whereby a fluid pressure is created acting against said bearing surfaces of said first and said second members.

2. The bearing assembly as claimed in claim 1 wherein said moving magnetic field generating producing means comprises an array of coils disposed in a circular pattern, each of said coils being selectively operable relative to the others of said coils to create a rotating magnetic field in said chamber.

3. The bearing assembly as claimed in claim 1 wherein one of said bearing surfaces oppositely disposed includes a pattern formed thereon for influencing fluids in movement adjacent thereto.

4. The bearing assembly as claimed in claim 3 wherein both of said bearing surfaces oppositely disposed include patterns formed thereon for influencing fluids in movement adjacent either of said bearing surfaces.

5. The bearing assembly as claimed in claim 3 wherein said pattern comprises grooves formed on its respective bearing surface.

6. The bearing assembly as claimed in claim 1 wherein said chamber is further defined by a permanent magnet assembly and a gap situated between said permanent magnet assembly and one of said bearing members, said gap being magnetically influenced by said permanent magnet assembly whereby said magnetic fluid is prevented from passing through said gap.

7. Bearing device comprising in combination, at least a first and a second structural members disposed in proximity to each other, each said member having a bearing surface oppositely disposed to the other, said bearing surface forming a chamber therebetween for containing magnetic fluid; means for generating at least one leading magnetic field moving in a predetermined annular path, and for pressurizing said magnetic fluid within said chamber.

8. Bearing device as claimed in claim 7 wherein said magnetic field includes an array of magnetic field producing coils disposed in circular relationship relative to said, whereby a leading, rotating magnetic field is established in said.

9. Bearing device as claimed in claim 7 wherein at least one said surface includes fluid directing means for directing said fluid when in motion along a predetermined path.

10. Bearing device as claimed in claim 9 wherein said fluid directing means includes a formed surface, said surface urging said magnetic fluid to a predetermined location between said two structural members.

11. Bearing device as claimed in claim 10 wherein said fluid directing means further includes grooves formed on said surface, said grooves forming a pattern.

12. Bearing device as claimed in claim 11 wherein said pattern includes a spiral pattern including grooves formed in a spiral emanating from a point.

13. Bearing device as claimed in claim 11 wherein said pattern includes a straight groove pattern.

14. Bearing device as claimed in claim 11 wherein said pattern includes a groove pattern whereby upon movement of said magnetic fluid adjacent said pattern, said magnetic fluid is urged to, and is pressurized at a predetermined location.

15. Bearing device as claimed in claim 9 wherein said chamber is further defined by a gap and a magnet asembly adjacent said gap, and forming a magnetic field in said gap.

16. Bearing device as claimed in claim 15 wherein said magnet assembly comprises a permanent magnet.

* * * * *